Patented May 26, 1925.

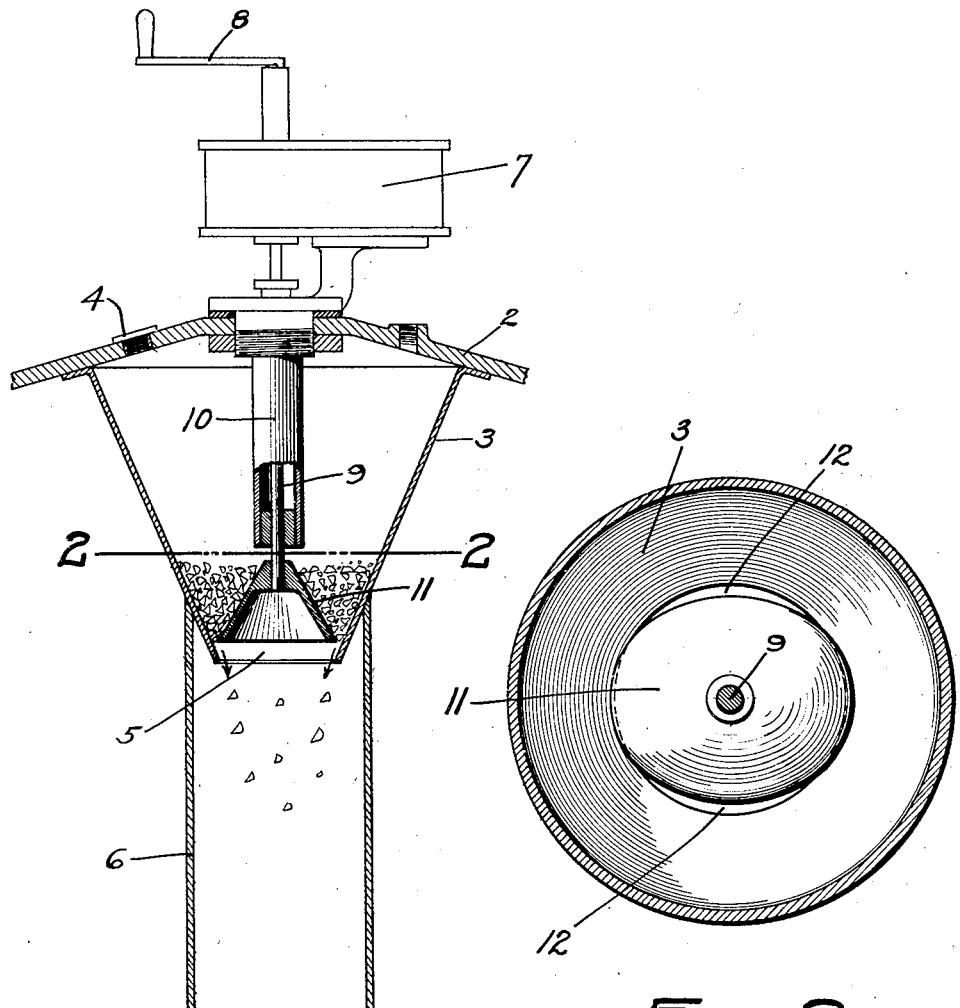

1,539,606

UNITED STATES PATENT OFFICE.

ELMER H. SMITH, OF MINNEAPOLIS, MINNESOTA.

CARBIDE-FEEDING MEANS.

Application filed December 13, 1923. Serial No. 680,424.

*To all whom it may concern:*

Be it known that I, ELMER H. SMITH, a citizen of the United States, resident of Minneapolis, county of Hennepin, and State of Minnesota, have invented certain new and useful Improvements in Carbide-Feeding Means, of which the following is a specification.

The object of my invention is to provide improved means for agitating and feeding a body of carbide from a hopper wherein the carbide is contained.

The invention consists generally in various constructions and combinations all as hereinafter described and particularly pointed out in the claims.

In the accompanying drawings forming part of this specification,

Figure 1 is a vertical sectional view through a carbide hopper showing my improved feeding device therein;

Figure 2 is a sectional view on the line 2—2 of Figure 1.

In the drawing, 2 represents the top of the generator and also forming the top of a carbide hopper 3 having a filling opening 4 and a discharge passage 5 communicating with a vertically arranged pipe 6. On the top of the hopper is a suitable motor 7 having an operating crank 8, and depending within the hopper is a shaft 9 arranged within a sleeve 10 and having on its lower end a cone-shaped valve 11, the walls of which flare downwardly in opposition to the upwardly flaring walls of the hopper.

As shown in Figure 2, the valve is not a perfect circle in cross section but is made oval substantially in form so that it does not entirely cover and close the circular opening 5 in the bottom of the hopper. The effect of this shape of the valve is to provide narrow openings 12 on each side of the valve as it is revolved by the operation of the motor; these openings being alternately exposed and closed as the valve rotates, and evidently the shape of the valve will cause an irregular movement through the carbide alternately pressing outwardly upon it and releasing it and producing sufficient agitation to prevent the lumps of carbide from adhering together or bridging in the lower portion of the hopper and becoming clogged and checking the feed of the hopper. As long as the valve is in motion the material will be agitated or disturbed and be fed in a uniform stream through the opening in the bottom of the hopper. The valve may be made in various sizes and the degree of curvature of its walls may be modified to increase or decrease the area of the discharge opening.

I claim as my invention:

1. The combination with a hopper having a circular discharge opening, of a valve mounted to rotate within said hopper near said discharge opening, said valve being substantially oval in horizontal cross section and of less diameter in one direction than said discharge opening and adapted upon rotation to alternately open and close a portion of said discharge opening, and agitate the material adjacent to said discharge opening.

2. The combination with a carbide hopper having converging walls and a circular discharge opening, of a shaft depending within said hopper and having means for revolving it, a valve mounted on said shaft and having walls flaring oppositely toward the walls of said hopper, said valve being substantially in horizontal cross section and of less diameter in one direction than said discharge opening and adapted upon rotation to alternately open and close a portion of said discharge opening between said valve and the wall of said hopper as said valve is revolved.

3. The combination with a hopper, having a discharge opening, of a valve mounted to rotate adjacent said opening, said valve being of greater diameter than said opening in one direction and of less diameter than said opening in the other direction whereby when said valve is revolved in the material in the hopper a portion of said opening will be alternately opened and closed and the material in said hopper agitated adjacent to said opening.

In witness whereof, I have hereunto set my hand this 10th day of December 1923.

ELMER H. SMITH.